United States Patent [19]

Moore

[11] Patent Number: 5,072,759

[45] Date of Patent: Dec. 17, 1991

[54] REVERSE STRANDED CONDUIT

[75] Inventor: Bruce H. Moore, Kent, Ohio

[73] Assignee: Teleflex Incorporated, Limerick, Pa.

[21] Appl. No.: 468,082

[22] Filed: Jan. 22, 1990

[51] Int. Cl.$^5$ .............................................. F16L 11/12
[52] U.S. Cl. ..................................... 138/153; 138/133; 138/172; 138/174; 138/178; 74/502.5
[58] Field of Search ............... 138/103, 108, 110, 113, 138/129, 130, 132, 133, 134, 144, 153, 172, 178, 174; 74/500.5, 502.5; 174/47

[56] References Cited

U.S. PATENT DOCUMENTS

| | | | |
|---|---|---|---|
| 2,277,397 | 3/1942 | Graham | 138/133 |
| 3,511,280 | 5/1970 | Mercier | 138/30 |
| 4,229,613 | 10/1980 | Braun | 138/103 |
| 4,674,543 | 6/1987 | Ziemek et al. | 138/132 |

*Primary Examiner*—James E. Bryant, III
*Attorney, Agent, or Firm*—Reising, Ethington, Barnard, Perry & Milton

[57] ABSTRACT

A conduit including an inner tubular liner comprised of organic polymeric material, an outer case and an intermediate layer of metallic filaments extending alternatively in a first direction and then in a second opposite helical direction about the inner tubular liner. The method of making same comprises the steps of; providing an organic polymeric inner tubular liner, applying a single layer of filaments alternately in a first helical direction and then in a second opposite helical direction continuously about the inner liner, and applying an outer layer thereabout.

4 Claims, 1 Drawing Sheet

REVERSE STRANDED CONDUIT

TECHNICAL FIELD

This invention relates to a motion transmitting remote control assembly of the type for transmitting motion in a curved path by a flexible motion transmitting core element, and more particularly to the flexible conduit.

BACKGROUND ART

Flexible conduits used in motion transmitting remote control assemblies typically include helically wound wire filaments to carry the tensile loads longitudinally of the conduit caused by movement of the core element. Flexible conduits usually include an inner tube and an outer casing with an intermediate layer of wire filaments therebetween. The intermediate layer of wire filaments extends longitudinally and helically about the inner tube.

The U.S. Pat. No. 4,000,759 issued to Higbee discloses an inner tube reinforced with two helically opposed layers of filaments wrapped thereabout and an outer casing 18. It has been found, however, that each layer may "walk" or axially displace, i.e., recede inside one end and extend at the other. The residing at one end of the conduit causes a reduction in the strength of the conduit.

U.S. Pat. No. 3,977,440 issued to Phillippi discloses a flexible conduit including an inner tube and an outer casing with an intermediate layer of helically stranded filaments therebetween. The intermediate layer of filaments comprises one layer of filaments with a second layer of filaments helically stranded opposite to the first layer of filaments. It, however, has the deficiency that an intermediate layer comprised of two helically opposed filament layers is extremely costly to manufacture.

SUMMARY OF THE INVENTION AND ADVANTAGES

A conduit comprising an inner tubular liner, an intermediate layer of filaments extending longitudinally and helically about the inner tubular liner and an outer layer disposed about the intermediate layer. The assembly is characterized by the filaments of the intermediate layer extending alternatively in a first helical direction and then in a second opposite helical direction about the inner tubular liner.

A method is provided for making the above conduit. The method of making a reverse stranded conduit comprises the steps of providing an organic polymeric inner tubular liner, applying an intermediate layer of helically wound filaments and applying an outer layer about the intermediate layer of filaments. The method is characterized by spiralling a single layer of filaments in a first helical direction and then in a second opposite helical direction continuously about the inner tubular liner.

An advantage of utilizing a reverse stranded conduit having an intermediate layer including filaments is that the filaments tend to "walk" towards both ends and thus no receding occurs. Another advantage is that the cost of manufacturing is substantially reduced without sacrificing any conduit flexibility.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
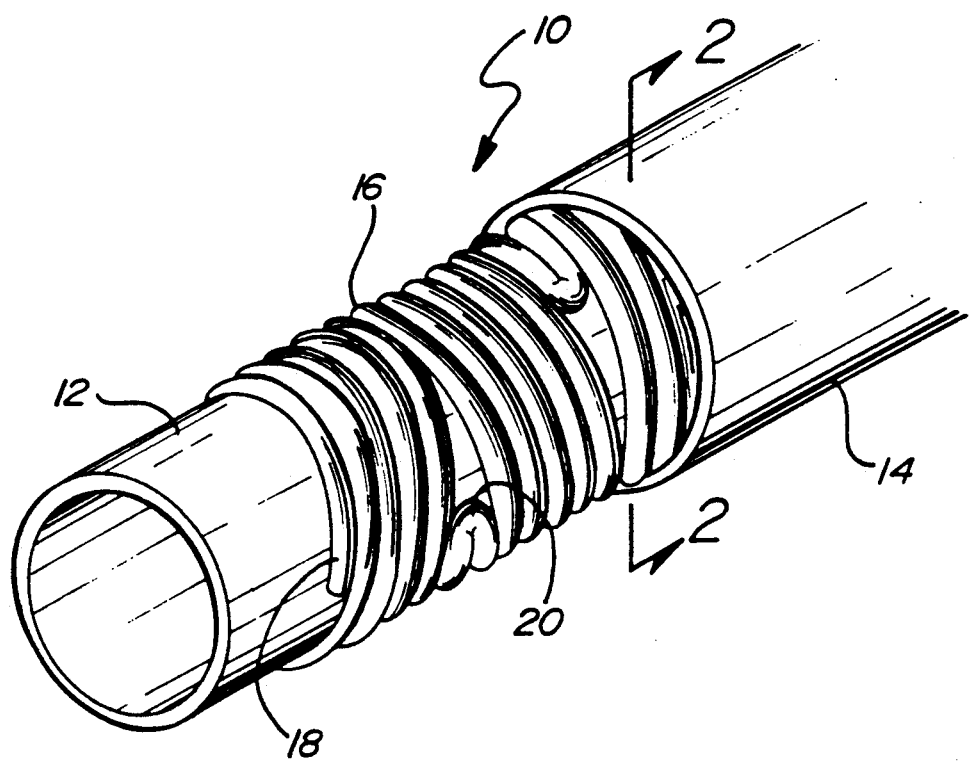
FIG. 1 is an isometric view of the reverse stranded conduit.

A reverse stranded conduit is generally shown at 10 in the Figures. The reverse stranded conduit 10 includes an inner tubular liner 12, an outer layer 14 and an intermediate layer 16 therebetween.

The inner tubular liner 12 is comprised of an organic polymeric material. The outer layer 14 comprises an adhesive material such as tape or fiber. The adhesive material limits the movement of the wire filaments 18.

The intermediate layer 16 includes a filament or filaments 18 extending longitudinally and helically about the inner tubular liner 12. The a filament or filaments 18 are comprised of metallic material and extend alternately in a first helical direction and then in a second opposite helical direction. The a filament or filaments 18 are disposed in side by side relationship to one another. In other words, the a filament or filaments 18 do not overlap each other and thus a second layer of filaments 18 is not created. The point at which each filament 18 changes helical direction creates a curved portion 20, is shown in FIG. 1.

Figure 2:
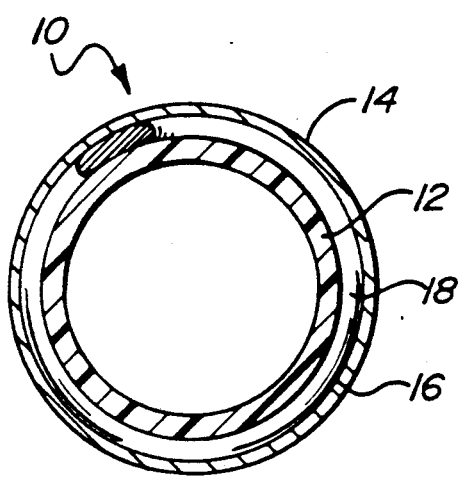
FIG. 2 is a cross-sectional view of a multi-filament reverse stranded conduit.
Figure 3:
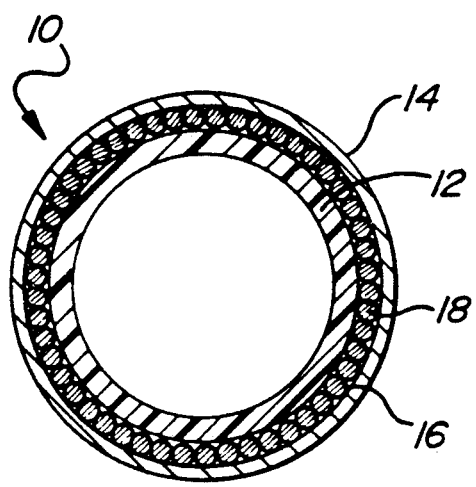
FIG. 3 is a cross-sectional view taken along line 3—3 of FIG. 1.

The reverse stranded conduit 10 may comprise a plurality of a filament or filaments 18 (i.e., full complement) as shown in FIG. 2, or a single filament 18 as shown in FIGS. 1 and 3.

The method of making the reverse stranded conduit 10 comprises providing an organic polymeric inner tubular liner 12. The inner tubular liner 12 is extruded by an extruder as known in the art.

An intermediate layer 16 comprised of a helically wound a filament or filaments 18 is then spiralled about the inner tubular liner 12. The a filament or filaments 18 are spiralled in a first helical direction for more than one full revolution as shown in FIG. 1, and then in a second opposite helical direction for more than one full revolution continuously about the inner tubular liner 12. The filament or filaments 18 are spiralled in a side by side relationship. The stranding of the filament or filaments 18 is done simultaneously with the extrusion of the inner tubular liner 12 by any known strander.

As the strander changes the helical direction, an outer layer 14 is applied about the intermediate layer of a filament or filaments 18. The outer layer 14 may utilize a fiber or wire filament, a tape, or a hot melt organic polymeric subsequently quenched to retain position. The outer layer 14 holds the intermediate layer of a filament or filaments 18 during the reversal of helical spiral.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A conduit (10) comprising:

an inner tubular liner (12);

an intermediate layer (16) of at least one filament (18) extending longitudinally and helically about said inner liner (12);

an outer layer (14) disposed about said intermediate layer (16);

said assembly characterized by said filament (18) of said intermediate layer (16) extending alternately in a first helical direction for more than one revolution about said inner tubular liner (12) and then in a second opposite helical direction for more than one revolution about said inner tubular liner (12).

2. An assembly as set forth in claim 1 further characterized by said filaments (18) of said intermediated layer (16) being disposed in side by side relationship to one another.

3. An assembly as set forth in claim 1 further characterized by said inner tubular liner (12) comprising organic polymeric material.

4. An assembly as set forth in claim 3 further characterized by said filament (18) comprising metallic material.

* * * * *